US012736737B2

(12) United States Patent
Ikeda et al.

(10) Patent No.: US 12,736,737 B2
(45) Date of Patent: Sep. 15, 2026

(54) VEHICLE INTERIOR ILLUMINATION LAMP

(71) Applicant: YAZAKI CORPORATION, Tokyo (JP)

(72) Inventors: Takayuki Ikeda, Shizuoka (JP); Tetsuro Takasaki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 18/790,640

(22) Filed: Jul. 31, 2024

(65) Prior Publication Data

US 2024/0393521 A1 Nov. 28, 2024

Related U.S. Application Data

(63) Continuation of application No. PCT/JP2023/010141, filed on Mar. 15, 2023.

(30) Foreign Application Priority Data

Mar. 22, 2022 (JP) ................................ 2022-045116

(51) Int. Cl.
*F21V 8/00* (2006.01)
*B60Q 3/20* (2017.01)
*B60Q 3/64* (2017.01)

(52) U.S. Cl.
CPC ............. *G02B 6/0053* (2013.01); *B60Q 3/20* (2017.02); *B60Q 3/64* (2017.02); *G02B 6/0031* (2013.01)

(58) Field of Classification Search
CPC ...... G02B 6/0053; G02B 6/0031; B60Q 3/64; B60Q 3/20
See application file for complete search history.

(56) References Cited

U.S. PATENT DOCUMENTS

2003/0137824 A1* 7/2003 Shinohara ............ G02B 6/0061 362/330
2016/0313496 A1* 10/2016 Hirayama ............ G02B 6/0055
2022/0268987 A1* 8/2022 Kanbayashi ........... G02B 6/002
(Continued)

FOREIGN PATENT DOCUMENTS

CN 209688741 U * 11/2019 ............ F21S 43/249
JP 11-238408 A 8/1999
(Continued)

*Primary Examiner* — Abdulmajeed Aziz
*Assistant Examiner* — Jessica M Apenteng
(74) *Attorney, Agent, or Firm* — Sughrue Mion, PLLC

(57) ABSTRACT

A vehicle interior illumination lamp includes: a design panel including a light transmission portion in at least a part of a front surface side of the design panel; a light source configured to emit light toward the front surface side of the design panel; a reflector arranged at a position facing the light transmission portion of the design panel and configured to reflect light from the light source; a light guide prism arranged on the reflector at a side where the light source is positioned and configured to allow each of light from the light source and light reflected by the reflector to be incident on the light guide prism; and an emission prism arranged on the reflector so as to be adjacent to the light guide prism and configured to emit light guided through the light guide prism toward the light transmission portion of the design panel.

9 Claims, 4 Drawing Sheets

(56) References Cited

U.S. PATENT DOCUMENTS

| | | | | |
|---|---|---|---|---|
| 2022/0397252 | A1* | 12/2022 | Kikuchi | F21S 41/24 |
| 2023/0273362 | A1* | 8/2023 | Yagi | G02B 6/0075 362/606 |

FOREIGN PATENT DOCUMENTS

| | | | | |
|---|---|---|---|---|
| JP | 2000-127847 A | | 5/2000 | |
| JP | 2001-135122 A | | 5/2001 | |
| JP | 2014-94679 A | | 5/2014 | |
| JP | 2014224712 A | * | 12/2014 | G02B 6/0046 |
| JP | 2019-50131 A | | 3/2019 | |

* cited by examiner

VEHICLE INTERIOR ILLUMINATION LAMP

CROSS-REFERENCE TO RELATED APPLICATIONS

The present application is a continuation of International Application No. PCT/JP2023/010141, filed on Mar. 15, 2023, and based upon and claims the benefit of priority from Japanese Patent Application No. 2022-045116, filed on Mar. 22, 2022, the entire contents of which are incorporated herein by reference.

TECHNICAL FIELD

The present disclosure relates to a vehicle interior illumination lamp that illuminates a vehicle interior of a vehicle.

BACKGROUND

JP2000-127847A describes this type of vehicle interior illumination lamp. The vehicle interior lamp described in JP2000-127847A includes a plurality of light-emitting diodes (light sources) and a transparent light guide plate formed with a diffuse reflection surface, and illuminates the vehicle interior by reflecting light of the plurality of light-emitting diodes via the diffuse reflection surface of the light guide plate.

SUMMARY OF INVENTION

However, with the configuration of the vehicle interior lamp described in JP2000-127847A, it is necessary to arrange the plurality of light-emitting diodes in parallel to uniformly illuminate the vehicle interior without uneven light.

The present disclosure is directed to a vehicle interior illumination lamp capable of uniformly emitting light from a part of a surface on a vehicle interior side with one light source and uniformly illuminating the vehicle interior without uneven light.

A vehicle interior illumination lamp in accordance with some embodiments of the present disclosure includes: a design panel including a light transmission portion in at least a part of a front surface side of the design panel, the light transmission portion being configured to transmit light; a light source configured to emit light toward the front surface side of the design panel; a reflector arranged at a position facing the light transmission portion of the design panel and configured to reflect light from the light source; a light guide prism arranged on the reflector at a side where the light source is positioned and configured to allow each of light from the light source and light reflected by the reflector to be incident on the light guide prism; and an emission prism arranged on the reflector so as to be adjacent to the light guide prism and configured to emit light guided through the light guide prism toward the light transmission portion of the design panel.

According to the above configuration, it is possible to provide the vehicle interior illumination lamp capable of uniformly emitting light from a part of the surface on the vehicle interior side with one light source and uniformly illuminating the vehicle interior without uneven light.

DETAILED DESCRIPTION OF INVENTION

Hereinafter, a vehicle interior illumination lamp according to an embodiment will be described in detail with reference to the drawings.

Figure 1:
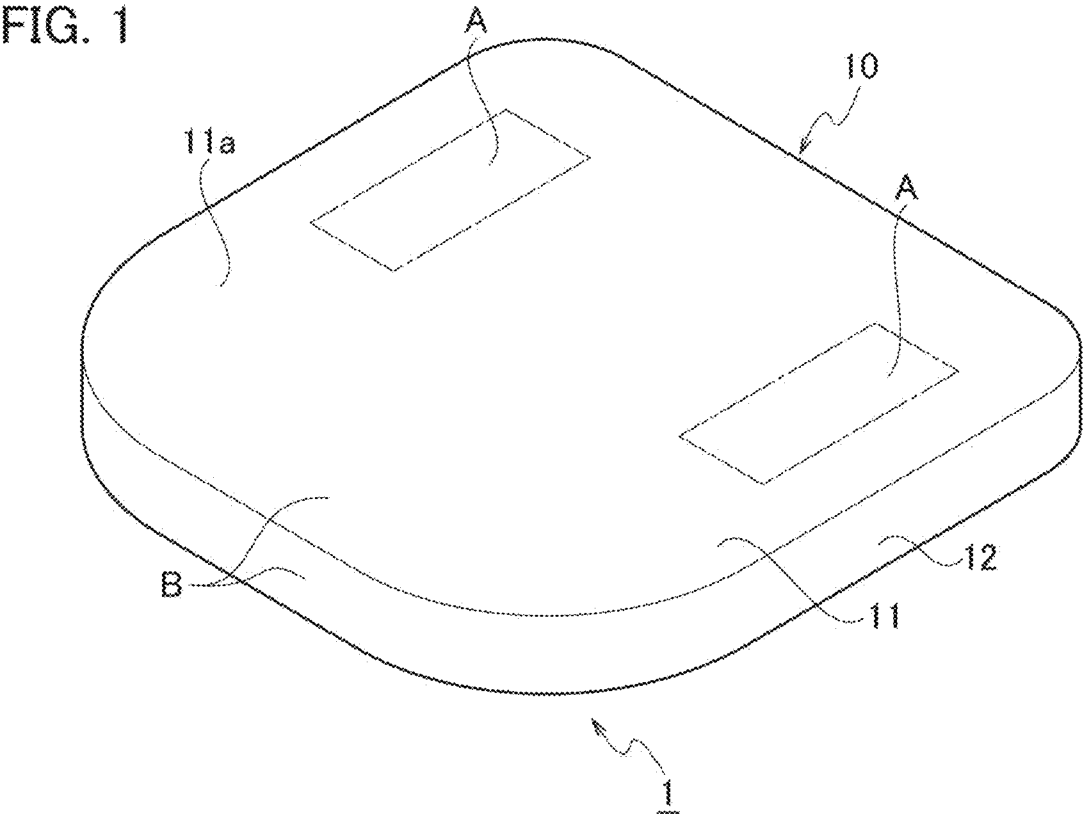
FIG. 1 is a perspective view that illustrates an example of a vehicle interior illumination lamp according to an embodiment.
Figure 2:
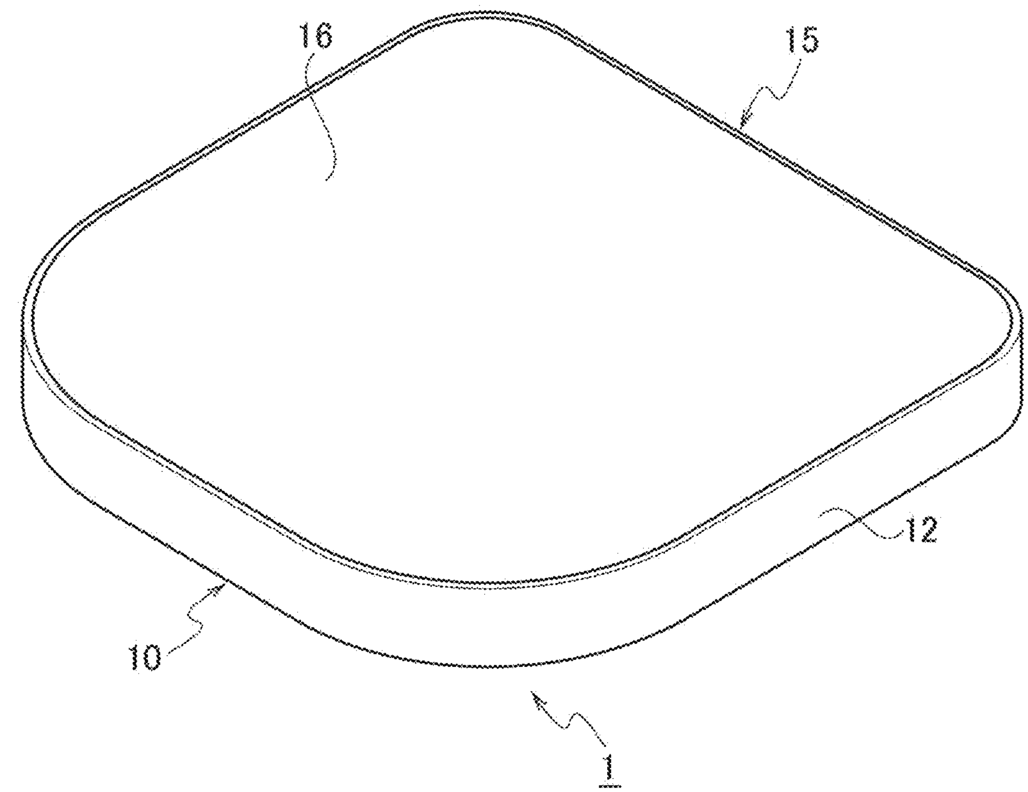
FIG. 2 is a perspective view of the vehicle interior illumination lamp as viewed from a back side.
Figure 3:
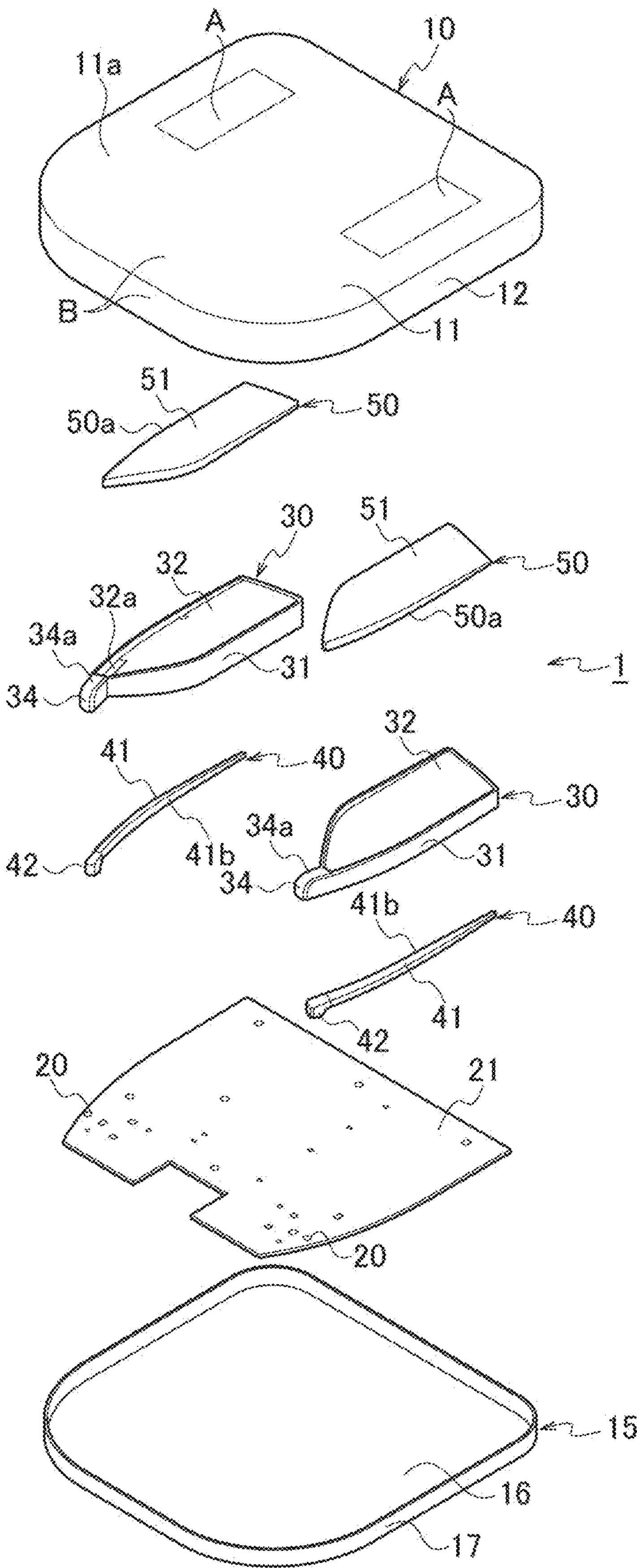
FIG. 3 is an exploded perspective view of the vehicle interior illumination lamp.
Figure 4:
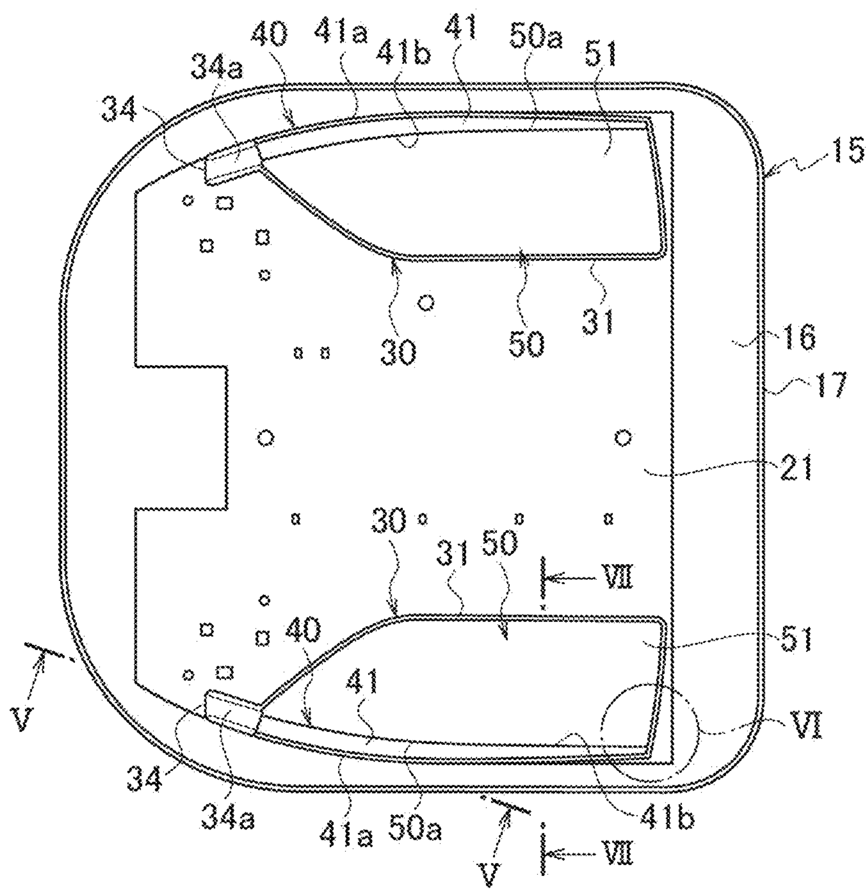
FIG. 4 is a plan view of an interior of the vehicle interior illumination lamp.
Figure 5:
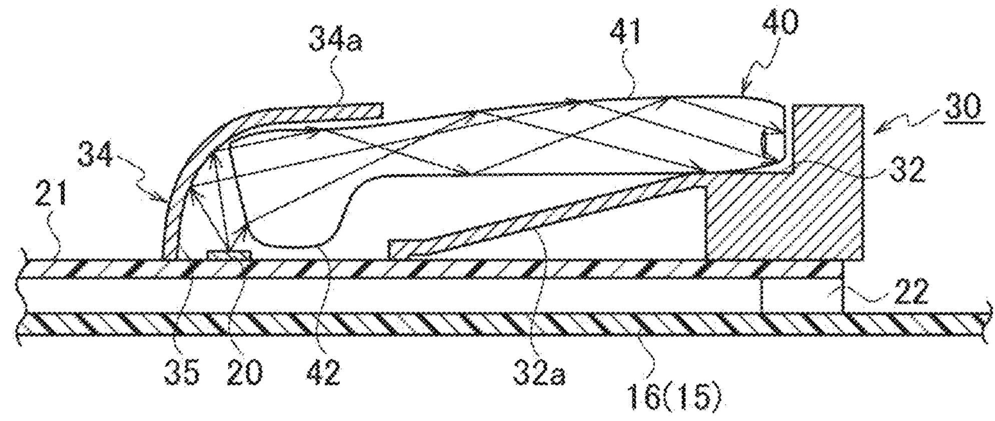
FIG. 5 is a cross-sectional view taken along line V-V in FIG. 4.
Figure 6:
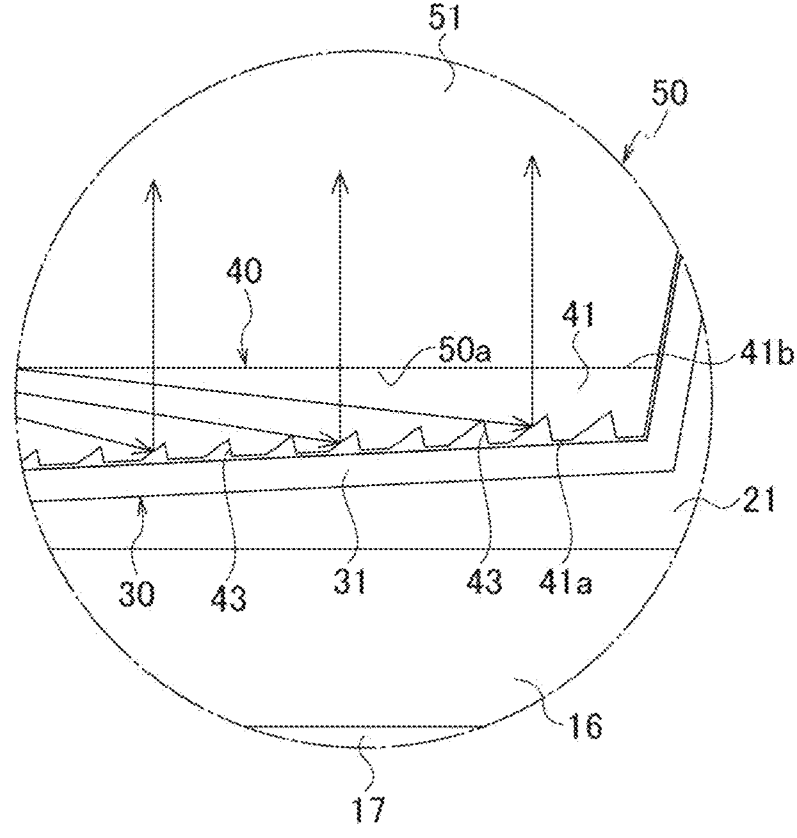
FIG. 6 is an enlarged plan view of portion VI in FIG. 4.
Figure 7:
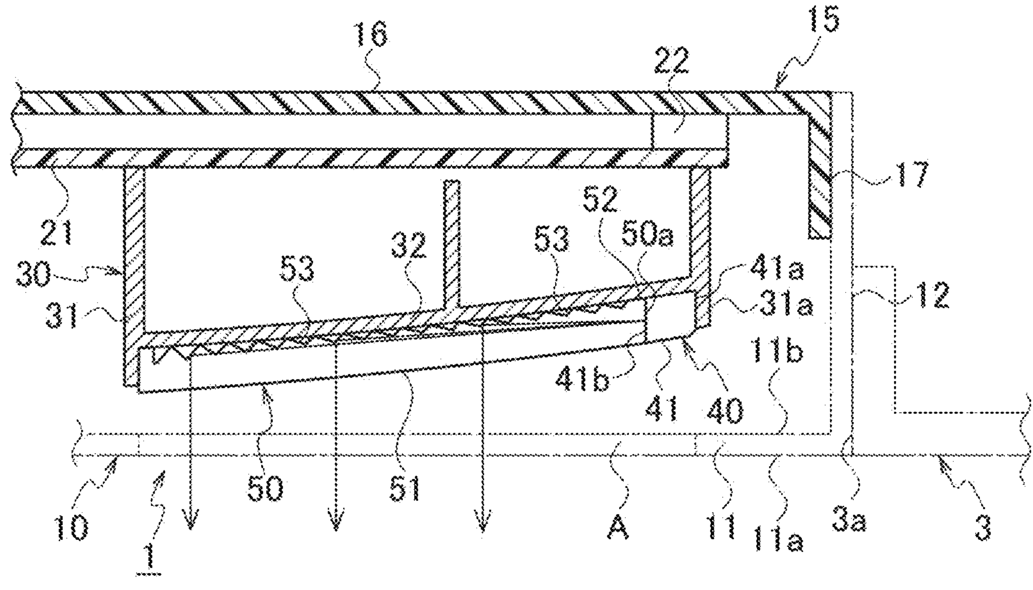
FIG. 7 is a cross-sectional view taken along line VII-VII in FIG. 4.

FIG. 1 is a perspective view that illustrates an example of a vehicle interior illumination lamp according to an embodiment. FIG. 2 is a perspective view of the vehicle interior illumination lamp as viewed from a back side. FIG. 3 is an exploded perspective view of the vehicle interior illumination lamp. FIG. 4 is a plan view of an interior of the vehicle interior illumination lamp. FIG. 5 is a cross-sectional view taken along line V-V in FIG. 4. FIG. 6 is an enlarged plan view of portion VI in FIG. 4. FIG. 7 is a cross-sectional view taken along line VII-VII in FIG. 4.

As illustrated in FIGS. 1 to 3 and 7, a vehicle interior illumination lamp 1 illuminates a vehicle interior 2 of a vehicle. The vehicle interior illumination lamp 1 includes a design panel 10, a light-emitting diode 20 as a light source, a reflector 30, a light guide prism 40, and an emission prism (light-emitting prism) 50. That is, as illustrated in FIG. 7, the vehicle interior illumination lamp 1 is attached to an opening 3*a* provided in an interior ceiling 3 of the vehicle via a bracket or the like (not illustrated), and uniformly illuminates the vehicle interior 2 without uneven light.

As illustrated in FIGS. 1 to 3, the design panel 10 is formed in a box shape with an open bottom surface side, having a ceiling wall portion 11 that is in a rectangular plate shape with arc-shaped four corners and a peripheral wall portion 12 extending in a rectangular cylindrical shape downward from a peripheral edge of the ceiling wall portion 11. A cover 15 is formed in a box shape slightly smaller than the design panel 10 with an open upper surface side, having a bottom wall portion 16 that is in a rectangular plate shape with arc-shaped four corners and a peripheral wall portion 17 extending in a rectangular cylindrical shape upward from a peripheral edge of the bottom wall portion 16. The box-shaped cover 15 is fitted into the interior of the box-shaped design panel 10 with the open side facing the bottom wall portion 16 side. At this time, the opening on the bottom surface side of the design panel 10 is covered with the box-shaped cover 15.

In addition, as illustrated in FIGS. 1 and 3, the design panel 10 includes a pair of light transmission portions (clear portions) A that transmits light in a part of both sides on the front surface 11*a* side of the ceiling wall portion 11. The ceiling wall portion 11 that is not the pair of light transmission portions A and the peripheral wall portion 12 are a non-light transmission portion (black portion) B that does not transmit light. Here, both sides on the front surface 11*a* side of the ceiling wall portion 11 are both sides with respect to the center of the ceiling wall portion 11 in a width direction.

The design panel 10 will be described in detail. The design panel 10 is resin-molded by two-color molding that uses a colorless and transparent light-transmitting synthetic resin serving as the light transmission portion A and a black opaque non-light-transmitting synthetic resin. Thus, light of the light-emitting diode 20 is transmitted through the light transmission portion A. The light of the light-emitting diode 20 is not transmitted through the black portion B. Further, as illustrated in FIG. 7, on a back side of the pair of light transmission portions A (a back surface 11*b* of the ceiling wall portion 11), an emission surface (light-emitting surface) 51 of the emission prism 50 described later on the vehicle interior 2 side is arranged so as to face a respective one of the pair of light transmission portions A.

As illustrated in FIGS. 3 and 5, a pair of light-emitting diodes (light sources) 20 is mounted on a front end side on both sides of a substantially rectangular thin plate-shaped substrate 21, and emits light toward the light transmission portion A of the design panel 10. On the substrate 21, a lighting circuit (not illustrated) or the like that causes the light-emitting diode 20 to emit light is print-formed. As illustrated in FIGS. 5 and 7, the substrate 21 is attached to the bottom wall portion 16 of the cover 15 via a plurality of placing bases 22.

As illustrated in FIGS. 4 and 5, the reflector 30 is formed in a substantially trapezoidal shape in plan view using a metal material that reflects light, and a pair of reflectors 30 is mounted from a front end edge side to a rear end edge side on both sides of the substrate 21. Here, "both sides of the substrate 21" are both sides with respect to the center of the substrate 21 in a width direction (the center in the up-down direction in FIG. 4). "From a front end edge side to a rear end edge side" means from one end side to the other end side of the substrate 21 in a front-rear direction (the crosswise direction in FIG. 4). As illustrated in FIG. 7, the reflector 30 includes a peripheral wall portion 31 that is in a trapezoidal frame shape and placed on the substrate 21, a placement portion 32, positioned above the peripheral wall portion 31, on which the prisms 40 and 50 are placed side by side, and a cylindrical portion 34 that is provided on a distal end side and reflects light from the light-emitting diode 20.

As illustrated in FIGS. 3 and 5, the placement portion 32 of the reflector 30 has, on the peripheral wall portion 17 side of the cover 15, an inclined portion 32*a* that is inclined downward toward the cylindrical portion 34 and contacts the substrate 21. The cylindrical portion 34 has a curved reflection portion 34*a* that is open on a lower surface side and extends upward in a curved manner. A light introduction port 35 is formed between the lower end of the cylindrical portion 34 and the distal end of the inclined portion 32*a* of the placement portion 32. The light-emitting diode 20 is positioned near the lower end of the cylindrical portion 34 in the light introduction port 35 on the substrate 21. Each of light from the light-emitting diode 20 and light reflected by the cylindrical portion 34 of the reflector 30 is incident on the light guide prism 40.

The light guide prism 40 is formed of a light-transmitting synthetic resin material. As illustrated in FIGS. 3 to 6, the light guide prism 40 includes a crescent-shaped prism main body 41 and a light introduction portion 42 formed thick at the distal end of the prism main body 41. In addition, as illustrated in FIG. 5, the light introduction portion 42 of the light guide prism 40 is inserted into the cylindrical portion 34 from the inclined portion 32*a* of the reflector 30. Each of light from the light-emitting diode 20 and light reflected by the reflector 30 is incident on the light guide prism 40 from the light introduction portion 42. In addition, in the light guide prism 40, the light incident from the light introduction portion 42 is guided into the prism main body 41. As illustrated in FIG. 4, the crescent-shaped prism main body 41 is curved such that a side surface 41*a* on the peripheral wall portion 31 side of the reflector 30 is convex. In addition, as illustrated in FIG. 6, the prism main body 41 of the light guide prism 40 has a plurality of lens cuts 43 on the side surface 41*a* on the peripheral wall portion 31 side of the reflector 30. The prism main body 41 refracts light in the prism main body 41 toward the emission prism 50 via the plurality of lens cuts 43 formed on the side surface 41*a*. That is, the direction of the light is changed to the direction toward the emission prism 50 by the plurality of lens cuts 43 provided on the side surface 41*a* of the prism main body 41.

As illustrated in FIGS. 4, 6, and 7, the emission prism 50 is formed of a light-transmitting synthetic resin material in a substantially trapezoidal shape in plan view. The emission prism 50 is arranged on the placement portion 32 of the reflector 30 so as to be adjacent to the light guide prism 40. More specifically, as illustrated in FIGS. 6 and 7, the emission prism 50 is fitted in a trapezoidal frame-shaped upper portion 31*a* of the peripheral wall portion 31 on the placement portion 32 of the reflector 30 in a state of being adjacent to the light guide prism 40. In the state in which the light emission prism 50 and the light guide prism 40 are adjacent to each other, the side surface 41*b* of the light guide prism 40 on the emission prism 50 side and a side surface 50*a* of the emission prism 50 are in contact with each other to be fitted to each other.

In addition, as illustrated in FIG. 7, the emission prism 50 includes a plurality of lens cuts 53 that refract light on a back surface (lower surface) 52 on the placement portion 32 side of the reflector 30. The emission prism 50 refracts light from the emission surface 51 that is the design surface side (upper surface side) of the emission prism 50 toward the design panel 10 through the plurality of lens cuts 53 provided on the back surface 52. In this manner, light emitted (exiting) from the emission surface 51 of the emission prism 50 toward the light transmission portion A of the design panel 10 can uniformly illuminate the vehicle interior 2 without uneven light. Note that the position of the lens cut 53 of the emitting prism 50 is farther from the light-emitting diode 20 than the position of the lens cut 43 of the light guide prism 40. For this reason, the size of the lens cut 53 of the emission prism 50 is formed to be smaller than that of the light guide prism 40.

In the vehicle interior illumination lamp 1 according to the above-described embodiment, as illustrated in FIG. 5, light of single light-emitting diode 20 mounted on the substrate 21 is incident on the light guide prism 40 and passes through the light guide prism 40. At this time, light that has exited the light guide prism 40 due to the influence of the incident angle is incident on the light guide prism 40 again via the reflector 30. Therefore, the loss of light in the vehicle interior illumination lamp 1 can be minimized.

In addition, as illustrated in FIG. 6, the traveling direction of the light passing through the light guide prism 40 is changed by the plurality of lens cuts 43 provided on the side surface 41*a* of the light guide prism 40, and the light is uniformly incident on the emission prism 50. As illustrated in FIG. 7, the light incident on the emission prism 50 is emitted toward the vehicle interior 2 by the plurality of lens cuts 53 provided on the back surface of the emission prism 50.

The plurality of lens cuts 43 provided on the side surface 41*a* of the light guide prism 40 diffusely reflect light that has reached the side surface 41*a* of the light guide prism 40. The plurality of lens cuts 53 provided on the back surface 52 of the emission prism 50 diffusely reflect light that has reached the back surface 52 of the emission prism 50. Therefore, according to the light guide prism 40 and the emission prism 50 provided with the lens cuts 43 and 53, it is possible to suppress point light and uneven light on the emission surface 51. In the vehicle interior illumination lamp 1 of the embodiment, even when single light-emitting diode 20 is used as a light source, light emitted from the emission surface 51 of the emission prism 50 can be made more uniform. That is, in the vehicle interior illumination lamp 1, light emitted by single light-emitting diode 20 is diffusely reflected by the lens cuts 43 and 53 of the light guide prism 40 and the emission prism 50, respectively, so that the light can be emitted from the entire region of the emission surface 51 of the emission prism 50 without uneven light. Therefore, according to the vehicle interior illumination lamp 1, it is possible to uniformly illuminate the vehicle interior 2 without uneven light, without increasing the amount of emitted light using a plurality of light sources.

In addition, as illustrated in FIG. 6, light guided by the light guide prism 40 is directed perpendicularly to the emission prism 50, so that the designability (decorativeness) of the plurality of lens cuts 53 provided on the back surface 52 of the emission prism 50 can be improved. Further, the emission surface 51 of the emission prism 50 is arranged so as to face the respective one of the pair of light transmission portions A provided in the ceiling wall portion 11 of the design panel 10, so that each emission surface 51 with uniform brightness (luminance) can sufficiently illuminate the vehicle interior 2.

The embodiment has been described above, but the embodiment is not limited thereto, and various modifications can be made within the scope of the gist of the embodiment.

That is, in the above-described embodiment, the reflector is formed of a metal material that reflects light such as aluminum. However, the reflector may be formed of a transparent resin material such as acrylic, and then a reflective film may be formed on front and back surfaces of the reflector by aluminum vapor deposition, or a reflective sheet may be attached.

In addition, according to the above embodiment, the light-emitting diode (LED) is used as the light source, but a light source other than the light-emitting diode may be used as the light source.

Some embodiments of the present invention have been described above, but these embodiments have been presented as examples, and are not intended to limit the scope of the invention. These novel embodiments can be implemented in various other forms, and various omissions, substitutions, and changes can be made without departing from the gist of the invention. These embodiments and modifications thereof are included in the scope and gist of the invention, and are included in the invention described in the claims and the equivalent scope thereof.

What is claimed is:

1. A vehicle interior illumination lamp comprising:

a design panel including a light transmission portion in at least a part of a front surface side of the design panel, the light transmission portion being configured to transmit light;

a light source configured to emit light toward the front surface side of the design panel;

a reflector arranged at a position facing the light transmission portion of the design panel and configured to reflect light from the light source;

a light guide prism including a light introduction portion arranged on the reflector at a side where the light source is positioned and configured to allow each of light from the light source and light reflected by the reflector to be incident on the light introduction portion, and a crescent-shaped prism main body configured to guide the light incident on the light introduction portion; and an emission prism arranged on the reflector so as to be adjacent to the crescent-shaped prism main body and configured to emit light guided through the crescent-shaped prism main body toward the light transmission portion of the design panel, wherein the crescent-shaped prism main body includes a plurality of second lens cuts arranged along a side surface of the crescent-shaped prism main body in a longitudinal direction of the crescent-shaped prism main body at a side of the reflector, and the plurality of second lens cuts are configured to refract light guided from the crescent-shaped prism main body toward the emission prism.

2. The vehicle interior illumination lamp according to claim 1, wherein the emission prism includes a plurality of first lens cuts arranged on a back surface of the emission prism at a side of the reflector and configured to refract light.

3. The vehicle interior illumination lamp according to claim 1, wherein the light transmission portion includes a pair of light transmission portions arranged on both sides of the front surface side, a portion of the design panel other than the pair of light transmission portions is a non-light transmission portion that does not transmit light, and emission surfaces of the emission prism are arranged so as to face the pair of light transmission portions, respectively.

4. The vehicle interior illumination lamp according to claim 1, wherein the light introduction portion is provided at a distal end of the crescent-shaped prism main body and has a portion closer to the light source than the crescent-shaped prism main body.

5. The vehicle interior illumination lamp according to claim 1, wherein the emission prism includes a plurality of first lens cuts arranged on a back surface of the emission prism at a side of the reflector and configured to refract light, a plurality of first lens cuts include a plurality of first grooves, the plurality of second lens cuts include a plurality of second grooves, and sizes of the plurality of first grooves are smaller than sizes of the plurality of second grooves.

6. The vehicle interior illumination lamp according to claim 1, wherein the emission prism has a trapezoidal shape in a plan view.

7. The vehicle interior illumination lamp according to claim 1, wherein the emission prism is arranged between the reflector and the front surface side of the design panel.

8. The vehicle interior illumination lamp according to claim 7, wherein the plurality of second lens cuts are arranged between the reflector and the emission prism.

9. The vehicle interior illumination lamp according to claim 1, wherein the reflector is configured to reflect light from the light source as direct light reflected from the light source, and the light introduction portion is configured to allow each of direct light from the light source and reflected light, of the direct light from the light source by the reflector, to be incident on the light introduction portion.

* * * * *